Figure 1:
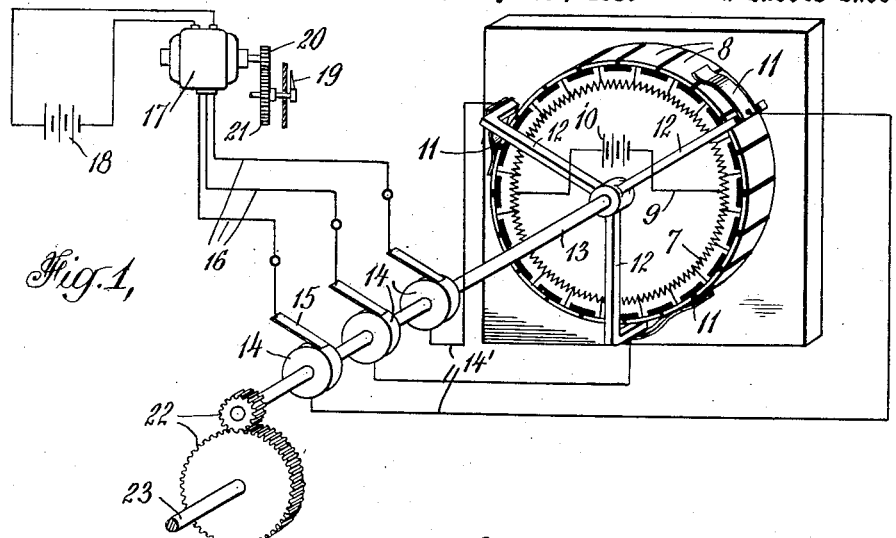

July 8, 1924.  
A. P. DAVIS  
SYNCHRONOUS TRANSMISSION SYSTEM FOR GYROSCOPES, ETC  
Filed May 26, 1919  
2 Sheets-Sheet 1  
1,500,239

INVENTOR  
Arthur P. Davis,  
BY  
ATTORNEYS.

July 8, 1924.  1,500,239
A. P. DAVIS
SYNCHRONOUS TRANSMISSION SYSTEM FOR GYROSCOPES, ETC.
Filed May 26, 1919   2 Sheets-Sheet 2
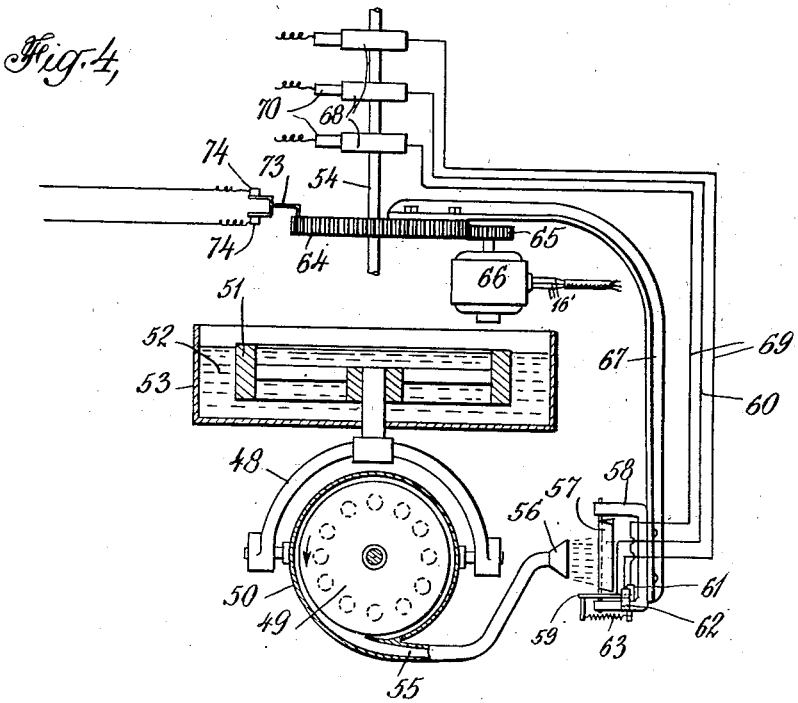
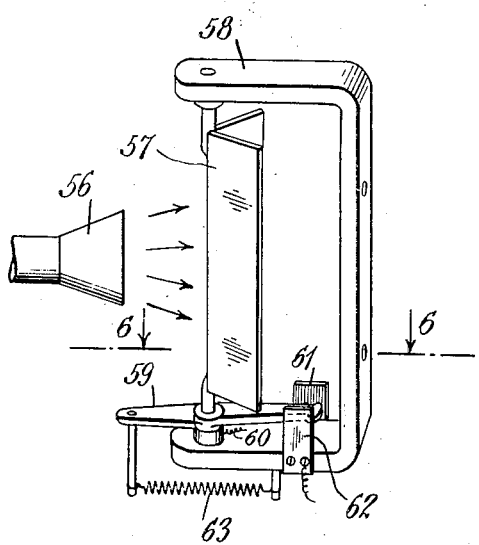
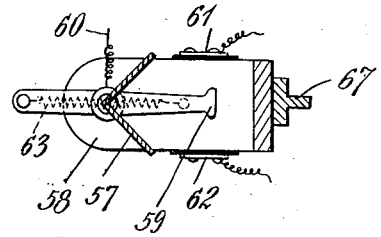
INVENTOR
Arthur P. Davis,
BY
ATTORNEYS.

Patented July 8, 1924.

1,500,239

UNITED STATES PATENT OFFICE.

ARTHUR P. DAVIS, OF FAR ROCKAWAY, NEW YORK.

SYNCHRONOUS TRANSMISSION SYSTEM FOR GYROSCOPES, ETC.

Application filed May 26, 1919. Serial No. 299,871.

*To all whom it may concern:*

Be it known that I, ARTHUR P. DAVIS, a citizen of the United States, residing at Far Rockaway, in the county of Queens, State of New York, have invented certain new and useful Improvements in Synchronous Transmission Systems for Gyroscopes, Etc.; and I do hereby declare the following to be a full, clear, and exact description of the invention, such as will enable others skilled in the art to which it appertains to make and use the same.

This invention relates to apparatus for indicating a bearing or the magnitude of an angle at a distant point and maintaining at the distant point a continuous indication of an angle or bearing which is constantly varying.

The invention involves the provision of a novel form of synchronous transmission system utilizing alternating electric current. The invention may be utilized in signalling or indicating systems of various types and for various uses; it is of special utility in a gyroscopic compass system for use on ship board, particularly a system involving a master gyroscope and a plurality of repeaters.

The synchronous transmission system consists of a transmitter in the form of a generator of three-phase alternating currents of varying frequency and a receiver in the form of a three-phase alternating current synchronous motor receiving current from the transmitter and operating to position an indicator. The transmitter consists of a resistance which is connected at a multiplicity of equally spaced points to the segments of a commutator, a source of supply of direct current connected to diametrically opposite points on the commutator, three brushes bearing on the commutator at equidistant points and means for rotating the brushes and commutator relatively. As the brushes are so rotated about the commutator, they receive three-phase current therefrom and the frequency of this current corresponds exactly to the rate of rotation of the brushes. This three-phase current is supplied to the synchronous motor of the receiver and causes its rotor to rotate in exact accordance with the rotation of the brushes of the transmitter.

In this form of synchronous transmission system, not only is exact correspondence attained in the rotation of the brushes of the transmitter and the rotor of the distant receiving station, but also when the rotation of the brushes is discontinued, a direct current flows over the three wires of the system to the motor of the receiver and serves to hold the rotor of that motor stationary in its proper position. Furthermore, extreme accuracy can be attained by connecting the rotor of the receiver-motor to the indicator of the receiver through multiplying gearing and using similar multiplying gearing at the transmitting station in the connections for rotating the brushes of the transmitter.

In applying such a synchronous transmission system to a gyroscopic compass system, the relative rotation of the brushes and commutator of the transmitter is effected in direct correspondence with the movements of the moving element of the master gyroscope. This may be done in various ways as for instance by utilizing the connections heretofore employed for operating the "follow-up" mechanism of the master gyroscope. This follow-up mechanism is usually actuated by a reversible motor which moves it about the axis of the gyroscope in either direction as the moving element of the gyroscope turns. Thus the element may carry a contact which makes electrical connection to either of two contacts positioned on opposite sides of it, so that as the element turns one way or the other, the circuit of the motor operating the follow-up mechanism will be closed in one direction or the other.

When this arrangement of the parts is employed, suitable electrical connections are carried off from the moving element of the gyroscope to the motor which effects the relative rotation of the brushes and commutator of the transmitter. From the transmitter, connections are made to all of the several repeaters employed in combination with the master gyroscope and each of these repeaters becomes a receiving station provided with a synchronous motor and an indicator positioned thereby. In the construction which I prefer to employ, the electrical connections from the contacts controlled by the moving element of the master gyroscope do not extend directly to the motor operating the follow-up system of the master gyroscope; instead, the motor of that follow-up system is connected in the system in a manner exactly similar to that employed in connection with the motors of the several repeaters.

The employment of the system above outlined in a gyroscopic compass installation is of special value by reason of the fact that it greatly facilitates the operation of resetting the several instruments employed to get them in synchronism. In a gyroscopic compass system including various repeaters employed on ship board, it sometimes happens that one or more of the repeaters get out of step with the master and of course they are rendered useless until they have been restored to exact correspondence with the master. As this operation has been conducted heretofore, it has been one of great difficulty and has consumed a considerable amount of time; the difficulty is, of course, greatly increased by the constant changing of the course of the ship which is inevitable. When employing such a transmission system as that above outlined, it is possible to synchronize the several instrumentalities employed in a very short time. In order to permit of this, each of the repeaters may be provided with a contact upon its moving element adapted to bridge two corresponding contacts of an electric circuit when the moving element arrives at a selected position, as for instance, the zero position, and these contacts may be so arranged that when the moving element arrives at this selected position, its motor is disconnected from the actuating circuit and preferably is instantly connected in a holding circuit which retains the moving element in the selected position. To reset the several repeaters and the master in synchronism, the transmitter of the system is operated to generate three-phase currents which are supplied to the several repeaters and actuates all of them to move them to the selected positions; and each repeater, as it arrives at that position, is disconnected from the actuating circuit so that eventually all of the repeaters move to and come to rest in the same position. It is then necessary to move the brushes and the commutator of the transmitter relatively until they assume a position which corresponds to the positions of the repeaters. This having been done, the normal connections of the transmission system are restored and the transmitter is operated, thereby causing the several repeaters and the follow-up mechanism of the master to be actuated until the moving elements of all of these parts have been moved around together to a position which exactly corresponds to the position then occupied by the moving element of the master gyroscope. Means may be provided for automatically discontinuing the operation of the transmitter when this exact correspondence with the master gyroscope has been established; or, preferably, the automatic operation may be such that the instant the synchronism of all the parts is established, the transmission system will be placed under the control of the moving element of the master gyroscope.

The invention also involves a novel form of contact system whereby the movements of the moving element of the master gyroscope may control the motor of the follow-up system of the master gyroscope, or preferably may control the motor of the transmission system. The high speed rotation of the rotor of the gyroscope on the moving element of a gyroscopic compass may be utilized without detriment to the operation of the apparatus to deliver a current of air radially from the axis about which the moving element of the gyroscope turns. I employ such a means for developing a current of air and in combination therewith I employ a pivoted vane which may be turned to one side or the other by the air current and which carries a contact adapted to engage one or the other of two co-operating contacts located at opposite sides. With this arrangement of the parts, when the moving element of the gyroscope turns slightly, the shifting of the position of the air current unbalances the forces on the two sides of the pivoted vane, resulting in a rocking movement of the vane which carries its contact into engagement with one of the cooperating contacts and this closes the electric circuit of a motor which either directly or indirectly causes the proper actuation of the follow-up mechanism of the compass. As an incident to the operation of the follow-up mechanism, the pivoted vane is moved around to follow the movement of the current of air and the movement of the vane continues until the vane has been carried far enough into the current of air to reestablish the balance of forces on the two sides of the vane and cause the vane to assume its mid-position in which its contact is free from both of the two co-operating contacts.

The features of the present invention above outlined are illustrated in the drawings annexed hereto which show diagrammatically arrangements of apparatus and electrical connections which may be employed in practicing the invention. It is to be understood, however, that the principles of the invention are of wide application in apparatus and connections which differ over a wide range.

Figure 2:
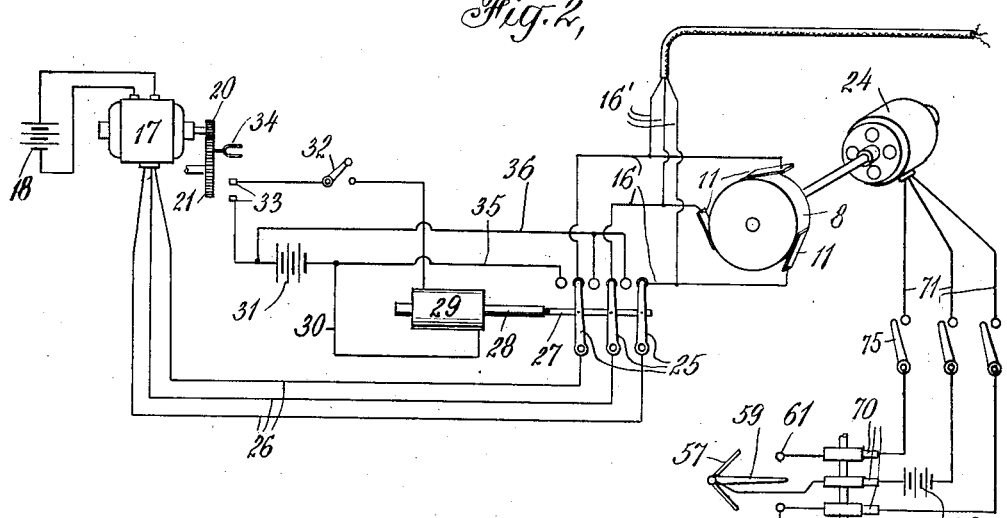
Figure 3:
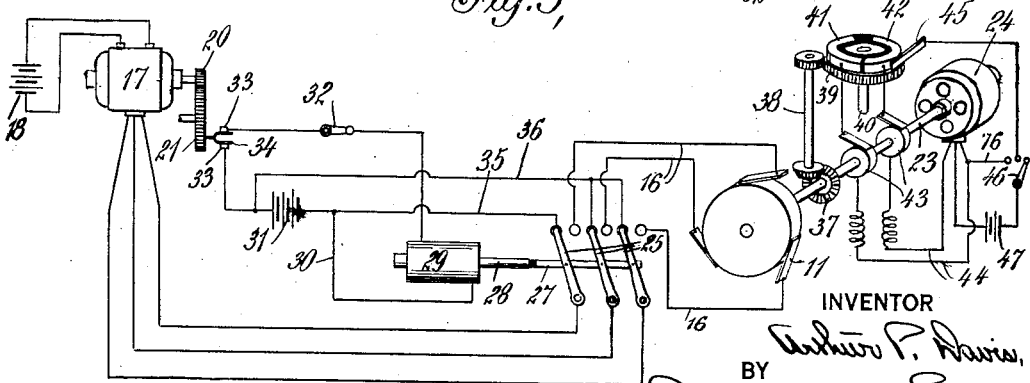

In the drawings, Fig. 1 is a diagrammatic view illustrating the transmission system; Fig. 2 is a diagrammatic view showing the transmission system illustrated in Fig. 1 with the addition of the parts necessary for effecting the automatic disconnection of a receiver motor from the transmission circuit; Fig. 3 is a view similar to Fig. 2 with the addition of the parts necessary for bringing the brushes of the transmitter into proper phase relation with the several receivers after the motors of the receivers have been brought to rest; Fig. 4 is a diagrammatic view of certain of the parts of a master gyroscopic compass showing particularly the apparatus for directing an air current from the gyroscope against the pivoted vane and the connections controlled by the vane; Fig. 5 is a perspective view on an enlarged scale of the vane and its associated parts illustrated in Fig. 4; and Fig. 6 is a horizontal sectional detail view on line 6—6 of Fig. 5.

Referring first to Fig. 1, the general features of the transmission system will be described. An electrical resistance of large ohmic value is indicated at 7 and this resistance is connected at a multiplicity of equally spaced points to the segments of a commutator 8. Diametrically opposite points on the resistance or diametrically opposite segments on the commutator are connected by wires 9 to a source 10 of supply of electrical energy, shown in Fig. 1 as a battery. Three brushes 11 spaced apart 120° are shown as bearing upon the segments of the commutator 8. These brushes are carried by arms 12 projecting from a shaft 13. On this shaft are three collector rings 14 each of which is connected to one of the brushes 11 by a wire 14'. Brushes 15 making contact with the collector rings 14 and the line wires 16 of the three-phase transmission system, are connected to the brushes 15. The shaft 13 is driven from any suitable source, preferably through speed-multiplying gearing 22 shown as connecting the shaft 13 to a shaft 23 which may be driven by an electric motor.

The line wires 16 of the three-phase transmission system extend from the brushes 15 to the distant receiving station or to a multiplicity of receiving stations located at different points. In Fig. 1 a single receiving station is indicated. At this station is a three-phase synchronous motor 17 having its field circuit energized from a direct current source indicated at 18. The rotor of the motor 17 is arranged to actuate an indicator 19 which may be any suitable form of indicator and may be actuated in any suitable manner.

In Fig. 1, the shaft of the motor 17 is shown as provided with a small pinion 20 in mesh with a gear 21 on the shaft of the indicator 19 as greater accuracy of the indications of the indicator 19 is secured when such multiplying gear is employed.

When the shaft 23 is driven by its actuating motor to rotate the shaft 13 in either direction, the brushes 11 will be rotated around upon the segments of the commutator 8 and the brushes will take off three-phase alternating current, this current being supplied to the segments of the commutator from the source 10 through the resistance 7. The current flowing through the resistance should be large compared with that taken off by the brushes 11, and, of course, the greater the number of segments in the commutator 8, the better will be the form of the wave of the alternating current. The three-phase current collected by brushes 11 is delivered to the wires 16 of the system by the collector rings 14 and flows to the motor 17 at the receiving station, causing rotation of the rotor of the motor in exact accordance with the rotation of the brushes 11 about the commutator 8. Whenever rotation of the brushes 11 is discontinued, a direct current will flow from the source 10 through the brushes 11 and wires 14' and 16 to the motor 17 of the receiver and will serve to hold the rotating element of the receiver motor stationary by reason of the reaction between the two members of the receiver motor, one supplied with direct current through the wires 16 and the other supplied with direct current from the source 18. With such a transmission system, great accuracy can be attained in transmitting angles or bearings from one station to another and the accuracy is greatly increased by the employment of speed multiplying gearing in the connections from the controlling member at the transmitting station to the shaft 13 of the transmitter and also in the connections from the shaft of the receiver motor 17 to the shaft of the receiver indicator.

As above mentioned, one of the marked advantages of this form of transmission system is the facility with which it lends itself to resetting the transmitting and receiving instruments in case they get out of step. Fig. 2 illustrates diagrammatically the arrangement of the connections which may be employed for reestablishing the synchronous relation of the parts. In this figure, the motor which rotates the brushes 11 about the commutator 8 is indicated diagrammatically at 24 and the three transmission wires are indicated at 16 as in Fig. 1. Branch wires 16' are indicated extending off to a second or various other receiving stations. The three transmission wires 16 are shown as connected to contacts adapted to be engaged by the three arms 25 of a double-throw switch. These arms 25 are connected by wires 26 to the indicator motor 17. The three arms 25 are connected by a rod 27 to the core 28 of a solenoid 29 having one of its terminals connected by a wire 30 to a source of supply of electric energy 31. The other terminal of the solenoid 29 is connected through a switch 32 to one of two contacts 33, the other of which is connected to the opposite side of the source of supply 31. These two contacts 33 are adapted to be bridged by a contact 34 mounted on one of the rotating members 21 of the receiver. When the solenoid 29 is energized, the three arms 25 are moved from the positions in which they are shown, breaking contact with the transmission wires 16, to positions in contact with three adjacent contact studs, one of which is connected by a wire 35 to one side of the source 31, and the other two of which are connected by a wire 36 to the opposite side of the source 31.

Fig. 2 shows the positions of the parts for normal operation, the switch 32 being open. Three phase currents collected from the commutator 8 are transmitted through the wires 16, the switch arms 25 and the wires 26 to the indicator motor 17 and actuate that motor in synchronism with the rotation of the brushes 11. During this operation, the bridging of the stationary contacts 33 by the contact 34 at any given time will be without effect as the switch 32 is open. If for any reason the receiving instrument 17 gets out of the proper phase relation to the transmitter, the connections to the motor 24 are closed so as to operate the motor 17 continuously in one direction long enough to carry the contact 34 around to the position for bridging the stationary contacts 33 and the switch 32 is closed. When the contacts 33 are bridged by contact 34, current from the source 31 flows through those contacts and the switch 32 and through the coils of the solenoid 29, thus energizing the solenoid and causing it to attract its core and shift the switch arms 25 from the positions in which they are shown in Fig. 2 to the positions in which they are shown in Fig. 3. This discontinues the supply of the three-phase alternating current from the transmitter to the receiver and instead connects the rotor 17 of the receiver in the circuit of the source of supply 31 through the wires 35, 36 and 26. Thus the motor 17 is supplied with direct current through the wires 26 instead of with alternating current as before, and the motor is not only brought to rest but is held positively against further rotation. The current from the source of supply 31, therefore, constitutes a holding current for holding the rotor of the motor 17 in the selected position when it has reached that position.

It will be understood that the transmitter would be connected to a number of receiving stations each provided with its motor 17 and in reestablishing the proper phase relation of all of the parts, the operation of the transmitter would be continued until all of the several receivers had been brought successively to the selected position and their motors disconnected from the transmission system and instead connected to the sources of supply of the holding current.

When all of the receivers have been brought to the selected position as above described, it is necessary to position the brushes appropriately upon the commutator so that their positions will correspond with the positions to which the receivers have been moved and in which they have been arrested. Fig. 3 illustrates the connections shown in Fig. 2 and above described with the switch arms 25 in the opposite position, and in addition Fig. 3 illustrates the parts necessary for rotating the brushes 11 to and stopping them in the positions corresponding to the positions in which the receiver motors have been arrested. On the shaft 23 of the motor 24 for rotating the brushes 11, is a bevel-gear 37 meshing with a similar gear on a shaft 38 carrying a pinion which meshes with a gear 39 on a rotary shaft 40. This shaft 40 also carries a commutator consisting of two segments 41 and 42, each approximating a semi-circle. On one side of the commutator these two segments are spaced apart just far enough to insulate them from each other, whereas on the opposite side the gap between them is of greater width. The two segments 41 and 42 are connected to brushes bearing on collector rings 43 on the shaft 23. From these collector rings 43 wires 44 lead to terminals of the motor 24. A brush 45 is mounted in position to engage the segments 41 and 42 of the commutator and this brush is connected through a switch 46 and source of supply 47 to a third terminal of the motor 24. These elements for the supply of actuating current to the motor 24 are employed only after the several receivers have been moved around to the selected position and then only for the purpose of moving the brushes 11 to the corresponding position. Until this movement of the brushes is to be effected, the circuit through brush 45 remains open; but after the receivers are all in the selected position, the normal source of supply of current to the motor 24 is disconnected and the switch 46 is closed. This results in closing circuit to the motor 24 through the switch 46 and brush 45 and that one of the segments 41 and 42 with which the brush 45 is in engagement. The flow of current in the coils of the motor 24 will be in one direction or the other depending upon which of the two segments 41 and 42 is engaged by the brush 45 and immediately upon the closing of the circuit of motor 24 in this manner, the motor will operate to rotate the brushes 11 in the direction determined as above indicated; such rotation of the brushes 11 by the motor 24, accompanied by rotation of the commutator consisting of the segments 41 and 42, will continue until the insulating section between the ends of the segments 41 and 42 comes under the brush 45. This opens the circuit of the motor 24 and rotation of the motor ceases with the brushes 11 positioned in correspondence with the positions in which the several receivers were previously arrested.

Fig. 4 illustrates diagrammatically some of the elements of the master gyroscopic compass. The moving element is indicated at 48; it includes the rotor 49 of the gyroscope mounted for rotation within a frame 50 which is pivotally supported upon a frame adapted to turn freely about a vertical axis. In the present instance, the frame is shown as suspended from a float 51 which is sustained by liquid 52 in a chamber 53. It will be understood that this means for sustaining the rotor of the gyroscope and permitting it to turn freely, is merely illustrative of various constructions which may be employed and has no bearing upon the invention of this application.

The follow-up mechanism of the compass is carried by a shaft 54 whose axis is coincident with the axis of the moving element of the gyroscope. This shaft 54 is turned back and forth about its axis to follow accurately the movements of the moving element of the compass including the gyroscope 49, but it is not actuated directly by the moving element since that would impose too much resistance to its movements. In accordance with the present invention, a pneumatically controlled follow-up mechanism is provided, including means for developing a blast of air by the rotation of the gyroscope, a movable vane positioned by this air-blast and electric contacts controlled by the vane. The rotation of the rotor 49 of the gyroscope may be utilized to develop a curent of air by merely providing a suitable outlet as that shown at 55 upon the casing 50 for the rotor 49. The high speed of rotation of the rotor 49 and the frictional contact of the air with the rotor is sufficient for the development of the necessary air current without making any special provision upon the surface of the rotor 49. The outlet 55 is connected to a suitable nozzle 56 for directing the air current laterally from the moving element of the gyroscope.

A pivoted vane 57 is mounted in position to be positioned by the blast of air from the nozzle 56. This vane 57, as shown in Figs. 5 and 6, is pivotally mounted to turn about a vertical axis upon a frame 58. Its lower pivot has a lever 59 secured to it and electrical connection is made to this lever 59 by a wire 60. The outer end of the lever 59 is adapted to move between two insulated contacts 61 and 62 and make electrical contact with either of them. On the inner end of the lever 59 is a pin to which one end of a very light coiled spring 63 is connected, the other end of this spring being connected to a stud on the frame 58.

When the blast of air from the nozzle 56 is directed upon the two plates of the vane 57 equally, the vane is held stationary as the forces acting thereon are balanced and the rear arm of lever 59 is midway between the two contacts 61 and 62. Any movement of the element of the gyroscope in either direction will serve to unbalance the forces acting upon the two plates of the vane 57 and the vane will turn immediately about the vertical axis in one direction or the other depending upon the direction of movement of the element of the gyroscope. As the vane so turns, the arm of lever 59 is carried into engagement with one or the other of the two contacts 61 and 62, thus closing one or the other of two electric circuits, depending upon the direction of movement of the element of the gyroscope.

The circuits controlled by these contacts 59, 61 and 62 may be the circuits of a follow-up motor actuating the compass card of the master gyroscope. Thus, turning movement of the element 48 in either direction will result in energizing the proper circuit of the follow-up motor so as to cause operation of the motor to shift the compass card about its axis in a direction corresponding to the direction of rotation of the gyroscope element. In that case the frame 58 would be suspended from some part of the follow-up mechanism so as to turn with the compass card. As a result, the compass card and the frame 58 carrying the vane 57 would be moved by the follow-up motor until finally the vane would overtake the blast of the air from the nozzle 56. When that occurred, the air blast would again act equally on the two plates of the vane 57 and return the vane to its mid-position with the result that the actuating circuit of the follow-up motor would be opened and the motor together with the compass card and the frame 58 would come to rest in the new position. In this connection it is to be noted that the spring 63 is a very light spring. It serves to hold the vane 57 in one or the other of its two extreme positions, but the spring is of insufficient tension to hold the vane in one of these extreme positions when the vane is acted upon by the relatively strong air blast from the nozzle 56. As soon as the force of the air blast is applied equally to the two blades of the vane 57, the vane is moved to its new position even though this is accompanied by a slight extension of the spring 63.

As above stated, the wires from the contacts 59, 61 and 62 may be carried direct to the motor of the follow-up system and that is the construction which would be employed in a gyroscopic compass to be used without repeaters.

When the compass is a master compass and is to be utilized in combination with a plurality of repeaters as is common in installations for large ships, I prefer to employ the arrangement of parts which is indicated diagrammatically in Figs. 4 and 2.

Referring to Fig. 4, 54 indicates the shaft of the follow-up mechanism and on this shaft is a gear 64. This gear meshes with a pinion 65 carried by the shaft of the follow-up motor 66. Secured to the gear 64 or a part moving therewith is an arm 67 on which the frame 58 of the vane 57 is mounted. On the shaft 54 are three collector rings 68, one of which is connected to the wire 60 leading from the lever 59 and the other two of which are connected to wires 69 which are connected to the contacts 61 and 62. Brushes 70 bear on the rings 68 as usual. In a gyroscopic compass to be used without repeaters, the wires leading from the brushes 70 would be carried direct to the follow-up motor 66.

In utilizing the principles of this invention in a system including repeaters, the wires leading from the brushes 70 extend to the motor 24 for operating the transmitter of the synchronous transmission system. This is indicated diagrammatically in Fig. 2 wherein the wires 71 are shown as extending from the brushes 70 to the transmitter motor 24, a source 72 of supply of electric energy being connected in the middle one of the three wires and the three wires being controlled by switch-arms 75. In this installation, the follow-up motor 66 of the master gyroscopic compass is connected in the synchronous transmission system just like one of the repeater motors so that the arm 67 and the parts carried thereby are moved around like the indicators of the repeaters.

To facilitate synchronizing all of the elements of the system, a contact 73 is mounted upon one of the rotating elements of the follow-up system on the master compass, as for instance, the gear 64, and this contact is arranged to coöperate with stationary contacts 74 in a manner similar to that above described in connection with the contacts 33 and 34 shown in Figs. 2 and 3.

The operation of the system as a whole has been indicated in the foregoing description, but the following may be added as a summary:

The transmitter indicated in Fig. 1 is preferably arranged in a compartment or upon a panel adjacent to the master compass and from this transmitter wires 16, 16' etc. extend to the motors of all of the repeaters and the motor of the follow-up system of the master compass. With the parts arranged as indicated in Figs. 2 and 4, any movement of the moving element of the master compass to one side or the other will cause the vane 57 to be turned about its vertical axis in a corresponding direction, resulting in closing the circuit of the source 72 through one or the other of the contacts 61 and 62. This circuit includes the transmitter motor 24 and the direction of flow of the current in the coils of the motor is dependent upon which one of the two contacts 61 and 62 is engaged by the arm 59. On closing the motor circuit thus, operation of the motor starts and with it rotation of the brushes 11 about the commutator 8. Such rotation of the brushes causes the transmission of three-phase alternating current over all of the transmission lines 16, 16' etc. to the motors 17 of all of the repeaters and the motor 66 of the follow-up system on the master compass, the frequency of this alternating current being determined by the rate of rotation of the brushes 11 about the commutator 8. The motors 17 and 66 being synchronous motors, will turn in exact correspondence with the alternations of the three-phase current supplied over the transmission lines and therefore the indicators of the repeaters will be actuated in exact correspondence with the operation of the transmitter. The motor 66 of the follow-up system of the master compass will be operated just like the motors of the repeaters to turn the shaft 54 and the arm 67 carried thereby, and as the shaft 54 is so turned, the vane 57 will be carried around with it. The movement of all these parts, including the transmitter of the transmission system and all of the repeaters, will be continued until the vane 57 is carried around far enough to bring it into the current of air from the nozzle 56. When the vane reaches this position, it will be restored to its middle position by the balancing of the forces upon its two blades and its movement to the mid position will be accomplished by opening the circuit of the transmitter motor. Thus the movement of brushes 11 about commutator 8 is discontinued and with it is discontinued the supply of alternating current to the motors 17 and 66. Instead of this alternating current, a direct current is supplied to those motors over the line 16, 16' etc. from the source 10 of supply of direct current and this direct current serves to hold the rotors of the motors 17 and 66 against accidental displacement from their proper positions. This is the normal operation of the system, any movement of the element of the master gyroscope being followed immediately by a rocking movement of the vane 57, closing the circuit of the transmitter motor 24, movement of the brushes 11 about the commutator 8 to transmit three-phase alternating current over the line 16, 16' to the motors 17 and 66, operation of the several repeaters and the follow-up mechanism of the master in amounts corresponding exactly to the magnitude of the movement of the master, movement of the vane 57 into the middle of the air blast, rocking of the vane to its mid-position to open the circuit of motor 24, discontinuance of the supply of three-phase alternating current to the motors 17 and 66, and substitution therefor of a direct holding current.

It may happen through one cause or another, as for instance a temporary accidental opening of one of the circuits, that the various elements of the system will get out of the proper phase-relation. This requires re-setting of the various elements of the system in exact correspondence, an operation which, with apparatus of the types heretofore employed, has been accomplished only with great difficulty and with an expenditure of a great deal of time. With the system above described re-setting may be accomplished with a facility heretofore unequaled. It may be assumed that all of the elements of the apparatus are in different phase-positions so that all must be brought together. To accomplish this, the switches 32 in the circuits of all of the several repeater motors 17 and the motor 66 are closed. The circuit of the motor 24 is closed in any suitable manner; thus, the switch-arm 46 shown in Fig. 3 may be moved to the position for closing a circuit through motor 24, battery 47 and wire 76, that is, a circuit which does not include the brush 45 and commutator 42, 43. The motor 24 is thus started in operation, rotating the brushes 11 about the commutator 8 and delivering three-phase alternating current to the lines 16, 16' etc. In each of these circuits, the three-phase current passes over the switch-arms 25 and wires 26 to the motor 17 and operates that motor until the contact 34 actuated thereby comes into bridging relation to the contacts 33. This results immediately in energizing the solenoid 39 and moving the switch arms 25 from the Fig. 2 to the Fig. 3 position. As before explained, this discontinues the supply of the three-phase current to the motor 17 and instead connects the armature of the motor in a holding circuit supplied with energy from the source 31. One after another the motors 17 of the several repeaters and the motor 66 of the follow-up system of the master are brought to rest in this selected position and if desired these conditions may be signaled back to the transmitting station by means of suitable signal lamps. After all of the motors 17 and 66 have been so positioned, the circuit connections to the motor 24 are changed so as to include the parts 41 or 42, 43, 44 and 45, as by moving the switch-arm 46 out of contact with the stud connected to the wire 76 and into contact with the stud connected to the brush 45. This results in operation of the motor 24 of the transmitter so as to shift the brushes 11 about the commutator 8 and this movement continues until the brush 45 bears on the insulating segment between the segments 41 and 42, when the circuit of the motor 24 through the switch 46 is opened. In this way the brushes 11 are moved to and brought to rest in a position which exactly corresponds with the position to which the repeaters and the follow-up mechanism of the master have been moved. When motor 24 is operated for this purpose, none of the other elements of the system is operated as the circuits to the several motors 17 and 66 had previously been opened by the switch-arms 25. The switch 46 is then opened. Then the several switches 32 are opened and the switch-arms 25 of the several repeater circuits are moved back manually or otherwise from the Fig. 3 to the Fig. 2 positions. Then the switch 75 is closed, thus re-establishing the connections for putting the entire system under the control of the master for normal operation. At this time, however, the vane 57 may be far removed from the blast from the nozzle 56. Accordingly the vane will have been moved by spring 63 to one of its extreme positions and will be held in that position by the spring. Its position will be that which it was caused to assume when it moved out of the air current. Immediately on closing switch 75, the transmitter motor 24 begins to operate, supplied with current from the source 72 through one of the contacts 61 or 62. The motor drives the transmitter and supplies three-phase current to all of the motors 17 and 66 as before and all of the repeaters together with the follow-up mechanism of the master are operated simultaneously and at the same speed, all starting from the same point and all moving together. As the follow-up mechanism of the master is operated, the frame 58 carrying the vane 57 is moved around toward the blast of air from the nozzle 56. This simultaneous operation of all of the repeaters and the follow-up mechanism of the master continues until the vane is carried around into the blast of air, whereupon the vane is at once shifted to its mid-position against the tension of its spring, opening the circuit of the transmitter motor 24. This results in bringing all of the repeaters and the follow-up mechanism of the master to rest with all of the elements of the system in the proper phase relation and with the control of the entire system restored to the master gyroscope so that any movement of the moving element of the master will actuate the vane and be repeated upon the repeaters and the master's follow-up system. With a convenient arrangement of the circuits and switches, the operation of resetting all of the elements of the system in synchronism may be performed in a very short time measured in minutes and seconds as against a period of time measured in hours required with apparatus of the character heretofore employed.

The system above described involves the employment of a number of novel features which may be embodied in a synchronous transmission system for gyroscopes and other apparatus in various forms. The drawings annexed hereto and the detailed explanation thereof serve to indicate how these features of the invention may be employed and constructions in which they may be embodied, but it is to be understood that the features of my invention are independent of particular constructions and particular arrangements of circuits. All modifications of the construction and arrangement of the parts illustrated and described herein I consider within the scope of the present invention and I aim to cover them by the terms of the claims appended hereto.

I claim:

1. A synchronous transmission system comprising the combination of a transmitter adapted to develop polyphase alternating current, a plurality of receivers each including a polyphase synchronous motor and an indicator driven thereby, transmission lines connecting the transmitter to all of the receivers, and devices for re-setting the receivers in phase with the transmitter including means for disconnecting the motor of each receiver from the transmission lines when the indicator of that receiver arrives at a selected position.

2. A synchronous transmission system comprising the combination of a transmitter adapted to develop polyphase alternating current, a plurality of receivers each including a polyphase synchronous motor and an indicator driven thereby, transmission lines connecting the transmitter to all of the receivers, and devices for re-setting the receivers in phase with the transmitter including means for disconnecting the motor of each receiver from the transmission lines when the indicator of that receiver arrives at a selected position and for simultaneously connecting that motor to a source of supply of direct current to hold the indicator of the receiver in the selected position.

3. A synchronous transmission system comprising the combination of a transmitter for developing polyphase alternating current, a plurality of receivers each including a polyphase synchronous motor and an indicator driven thereby, transmission lines connecting the transmitter to the motors of the several receivers and means for establishing the desired phase relation of all of the receivers to the transmitter including a switch in the transmission lines extending to each receiver motor, co-operating contacts for each receiver, one of which is actuated by the receiver-motor to bring the contacts into cooperation and thereby connect the receiver motor in a circuit including electrically operated means for opening said switch.

4. A synchronous transmission system comprising the combination of a transmitter for developing polyphase alternating current, a plurality of receivers each including a polyphase synchronous motor and an indicator driven thereby, transmission lines connecting the transmitter to each of the receiver-motors, a switch in the transmission lines extending to each receiver-motor, co-operating contacts for each receiver, one of which is actuated by the receiver motor in each instance to bring the contacts into co-operation and thereby connect the receiver motor in a direct current circuit including electrically operated means for opening said switch.

5. In a synchronous transmission system, a receiver including an indicator and an alternating current-motor actuating the same, transmission lines extending to the motor, a switch in said lines, a solenoid whose core is connected to the switch for opening the same, cooperating contacts, one of which is operated by the motor for controlling the current of the solenoid, and means actuated by the solenoid when it is energized for opening the said switch and for connecting a source of supply of direct current to the said motor.

6. A synchronous transmission system comprising the combination of a transmitter, a plurality of receivers each including a synchronous motor and an indicator driven thereby, transmission lines connecting the transmitter to all the receiver-motors, said transmitter being adapted to develop polyphase alternating current to operate normally all the receivers, means for separately discontinuing the normal operation of each receiver when its indicator arrives at a selected position, and means for thereafter actuating the transmitter independently of the receivers to move the transmitter into phase with the receivers.

7. A synchronous transmission system comprising the combination of a transmitter, a plurality of receivers each including a synchronous motor and an indicator driven thereby, transmission lines connecting the transmitter to all the receiver-motors, said transmitter being adapted to develop polyphase alternating current to operate normally all the receivers, means for separately discontinuing the normal operation of each receiver when its indicator arrives at a selected position, means for connecting each receiver-motor with a source of supply of direct current when its indicator arrives at the selected position to maintain it in that position, and means for thereafter actuating the transmitter independently of the receivers to move the transmitter into phase with the receivers.

8. A synchronous transmission system comprising the combination of a transmitter for developing polyphase alternating current, a plurality of receivers each including a synchronous motor and an indicator driven thereby, transmission lines extending from the transmitter to all of the receiver-motors, means for causing each of the receiver-motors, when operated by alternating current supplied from the transmitter, to be disconnected from the transmission lines when the indicator of that motor arrives at a selected position, and means for operating the transmitter when it has been disconnetced from all the receiver-motors for moving the transmitter to a position corresponding to the position of the indicators of all of the receivers.

9. A synchronous transmission system comprising the combination of a transmitter for developing polyphase alternating current, a plurality of receivers each including a synchronous motor and an indicator driven thereby, transmission lines extending from the transmitter to all of the receiver-motors, means for causing each of the receiver-motors when operated by current supplied from the transmitter to be disconnected from the transmission lines when its indicator has arrived at a selected position, and for simultaneously connecting the motor of that indicator to a source of supply of direct current to hold it against movement, and means for operating the transmitter, after it has been disconnected from all of the receiver-motors, to move the transmitter to a position corresponding to that in which the indicators of the several receivers were arrested.

10. A synchronous transmission system comprising the combination of a transmitter for developing polyphase alternating current, a plurality of receivers each including a synchronous motor and an indicator driven thereby, transmission lines extending from the transmitter to all of the receiver-motors, means for disconnecting the motors of the several receivers from the transmission lines with the indicators of the receiver-motors in selected positions, and means for operating the transmitter after it has been disconnected from the receiver-motors to move the transmitter to a position corresponding to that in which the indicators of the several receivers are arrested, including a motor for actuating the transmitter, a source of supply of electric energy for the motor and a commutator in the circuit of said source and motor having one of its parts actuated by the motor.

11. In a gyroscopic compass system, the combination of a master gyroscopic compass, an electric transmitter whose operation is controlled thereby, a plurality of repeaters each having an actuating motor supplied with current from the transmitter, means for establishing identity of phase relation of the moving elements of the repeaters and the transmitter and means for thereafter bringing the repeaters and transmitter into the proper phase relation to the master compass comprising means for operating the transmitter to supply current to the motors of the repeaters and for automatically discontinuing such operation of the transmitter when the repeaters have been moved into phase with the master.

12. In a gyroscopic compass system, the combination of a master gyroscopic compass, an electric transmitter having its operation controlled by movements of the moving element of the master compass, a plurality of repeaters each having a motor, connections through which current is supplied by the transmitter to the motors of the repeaters and means for bringing the elements of the system into phase comprising means for establishing phase identity of the repeaters and the transmitter, means for closing a circuit for causing operation of the transmitter and synchronous operation of the repeaters by current supplied from the transmitter, and means for opening the said circuit automatically to discontinue operation of the transmitter and the repeaters when identity of phase of the transmitter and repeaters with the moving element of the master compass has been established.

13. A gyroscopic compass system, comprising the combination of a master gyroscopic compass having a moving element and a follow-up mechanism, a transmitter whose operation is controlled by movements of the moving element of the master compass, a plurality of repeaters each having an actuating motor, a motor actuating the follow-up mechanism of the master, connections from the transmitter to the motors of all of the repeaters, and the motor of the follow-up mechanism of the master, means for establishing identity of phase of the repeaters and the follow-up mechanism of the master, and means including an element moving with the follow-up mechanism of the master for operating the transmitter to supply actuating current to the motors of all the repeaters and the follow-up mechanism to actuate them simultaneously and for automatically discontinuing their operation when the repeaters and the follow-up mechanism have been brought into phase with the moving element of the master compass.

14. A gyroscopic compass system comprising a master compass having a moving element, a transmitter, means for controlling the movement of said transmitter in accordance with the movements of said moving element including means for connecting said transmitter to said moving element and disconnecting it therefrom, a plurality of repeaters each having an actuating motor, circuits connecting said motors with said transmitter, and means including said circuits for bringing the elements of the system into phase comprising means for operating the transmitter independently of the master to actuate the repeaters and for disconnecting the several repeaters from the transmitter as each of them arrives at a selected position, and comprising means for thereafter operating the transmitter independently of the master to bring the transmitter to said selected position.

In testimony whereof I affix my signature.

ARTHUR P. DAVIS.